Dec. 11, 1928.　　　　　　　　　　　　　　　　　　　　1,695,231
A. EGAN
HACK SAW FRAME
Filed May 8, 1925
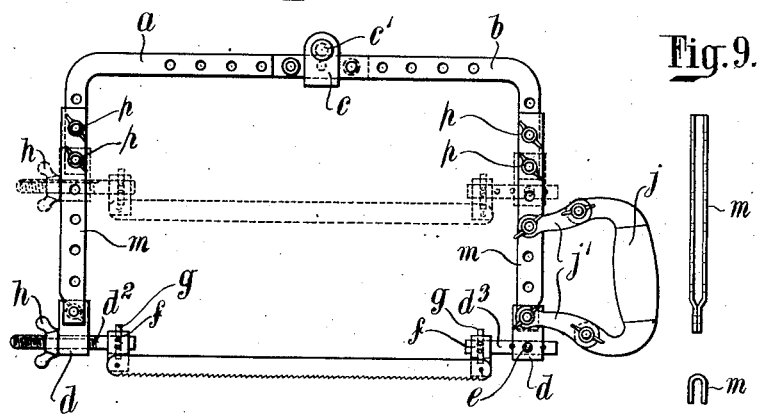
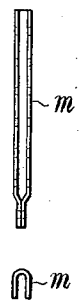
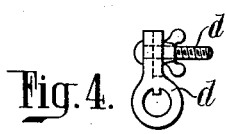
Inventor
Alfred Egan
By B. Singer, Atty.

Patented Dec. 11, 1928.

1,695,231

UNITED STATES PATENT OFFICE.

ALFRED EGAN, OF LONDON, ENGLAND.

HACK-SAW FRAME.

Application filed May 8, 1925, Serial No. 28,911, and in Great Britain June 23, 1924.

This invention relates to adjustable hack saws of the type in which means are provided for adjustment for various lengths of saw blades, and in which extension pieces are provided to increase the depth of the frame.

The frame consists of two flat steel members with ends turned at right angles, the longitudinal adjustment being effected by a steel peg, situated near the end of each member where they overlap which can be brought into engagement with any one of a series of holes in the other member, the overlapping ends of the two members being embraced by a short U-shaped member which holds them together in required position.

The means for increasing the depth of the frame, comprises a pair of adjustable U-shaped members, embracing the vertical parts of the flat frame members referred to above, the adjustment being effected by means of pins or bolts passing through holes in the U-shaped member and corresponding holes in the flat member.

Sockets, through which the bolts pass for blade tensioning can be taken off the vertical parts of the flat members and fixed on the U-shaped members; and smaller sockets, bearing pegs for carrying saw blades which can be secured in various angular positions are mounted on the tensioning bolts or the like for example on the usual corresponding pin for the opposite end of the blade to the adjusting bolt.

In the accompanying drawing:—

Fig. 1 is an elevation of the frame and saw complete.

Fig. 2 is a plan of part of the frame.

Fig. 3 is a view of the short U-shaped member for securing the parts of the frame in longitudinally adjusted position.

Figs. 4 and 5 are views of the socket members attached to the frame.

Fig. 6 is an end view of the tensioning screw.

Figs. 7 and 8 are views of the sockets carrying the pegs for the saw blade and

Fig. 9 shows two views of the extension members for varying the depth.

$a$ and $b$ are solid pieces of flat steel with ends turned at right angles and with holes drilled at equal distances apart along a section of its length. Steel pegs $a^1$ and $b^1$ are firmly secured in $a$ and $b$ respectively near the ends. Adjustment of length of frame is effected by the pegs $a^1$ and $b^1$ engaging in particular holes in $b$ and $a$ respectively, see Fig. 2, to give the length desired. The parts are held together by the clip $c$, see Fig. 3, placed over the overlapping ends of $a$ and $b$, the open end of $c$ being closed by means of a pin or bolt $c^1$ passing through holes in the clip $c$ just clear of the top sides of $a$ and $b$ and by tightening the bolt $c$ against the sides of $a$ and $b$.

The part $a$ is bent and set back to bring the end in line with $b$, see Fig. 2. The sockets $d$ are secured to the frame portions $a$ and $b$ by means of the bolts $d^1$ which pass through holes in the vertical parts of $a$ and $b$ and through corresponding holes in the socket $d$. Flanges or projections on the socket $d$ engage on each side of $a$ and $b$ and assist in taking strain when tension is applied to the saw blade. The hole in the socket $d$ which is positioned on the portion $a$ and through which a tensioning bolt $d^2$ passes, see Fig. 4, has a small projection or key inside the hole, which engages in a key way formed in the tensioning bolt $d^2$, see Fig. 6, which prevents the bolt from rotating.

The socket $d$ which is positioned on the portion $b$ has a plain round hole through which the pin $d^3$ passes, the said pin being a plain round piece of steel, which is secured to the socket $d$ by a pin $e$, the latter passing through a hole in the socket and a corresponding hole in the pin $d^3$. Additional holes are drilled in the pin $d^3$ for adjustment as considered necessary.

The socket $f$ which carries the pegs for the saw blade, see Fig. 7, has a hole through it large enough to go on the bolt $d^2$ or the pin $d^3$ and it also has holes drilled through the side of it. These holes are spaced a desired distance apart and their axes are mutually inclined at a desired angle for example the axes come at right angles to each other. A split pin $g^1$ passes through the hole which it is desired to use and also through one of two corresponding holes in the bolt $d^2$ or pin $d^3$ as the case may be. Corresponding holes are drilled in $d^2$ and $d^3$ through which the pin $g$ passes to allow the socket $f$ to be secured in various angular positions. Tension is applied to the saw blade by means of a winged nut $h$ on the bolt $d^2$. Without the extension pieces $m$ hereinafter described, the hack saw may be used for any purpose that the depth of the saw will allow.

The depth of the frame is increased to a desired extent, by removing the sockets $d$ off the parts $a$ and $b$, and putting on the extension pieces $m$ see Fig. 9. These pieces $m$ are of sheet steel bent into U shape and pressed closely together at one end, and embracing the vertical parts of $a$ and $b$. They are secured to the parts $a$ and $b$ by means of the four bolts $p$, two on $a$ and two on $b$ passing through holes in the pieces $m$ and corresponding holes in $a$ and $b$. The handle $j$ is connected to the part $b$ of the frame by means of pivot pins with clamping nuts passing through holes in links $j^1$ which are adjustable and have open ends embracing the handle $j$ and part $b$ or by corresponding holes in the handle $j$ and part $b$ or extension piece $m$ as desired when depth of frame is increased and when tension is applied to the blade, the saw is again ready for use.

What I claim and desire to secure by Letters Patent of the United States of America is:—

In combination with a hack saw frame having arm members, socket pieces secured to said arm members and each having a socket bore and a key projecting into said bore, bolts extending through said bores and having keyways engaged by said keys, a saw blade and members to which the ends of the saw blade are attached, said members having bores through which said bolts extend so that said members may be turned to arrange the blade in adjusted position with respect to the frame, said bolts and said members having radially related bores extending diametrically therethrough and pins for insertion in said bores to secure said members on said bolts in adjusted position.

In witness whereof I affix my signature.

ALFRED EGAN.